(12) United States Patent
Yoshida et al.

(10) Patent No.: US 11,884,003 B2
(45) Date of Patent: Jan. 30, 2024

(54) METHOD FOR PRODUCING POLYMER MEMBER

(71) Applicant: ASICS CORPORATION, Kobe (JP)

(72) Inventors: Eita Yoshida, Kobe (JP); Hideyuki Miyazaki, Kobe (JP)

(73) Assignee: ASICS CORPORATION, Kobe (JP)

( * ) Notice: Subject to any disclaimer, the term of this patent is extended or adjusted under 35 U.S.C. 154(b) by 358 days.

(21) Appl. No.: 17/278,956

(22) PCT Filed: Dec. 18, 2019

(86) PCT No.: PCT/JP2019/049588
§ 371 (c)(1),
(2) Date: Mar. 23, 2021

(87) PCT Pub. No.: WO2021/124475
PCT Pub. Date: Jun. 24, 2021

(65) Prior Publication Data
US 2022/0111580 A1 Apr. 14, 2022

(51) Int. Cl.
*B29C 64/124* (2017.01)
*B33Y 10/00* (2015.01)
(Continued)

(52) U.S. Cl.
CPC .............. *B29C 64/124* (2017.08); *B05D 7/02* (2013.01); *B29C 64/30* (2017.08); *B29C 71/04* (2013.01);
(Continued)

(58) Field of Classification Search
CPC ....... B29C 64/188; B29C 64/30; B33Y 40/20; B05D 7/02; B05D 2201/00; B05D 2201/02
See application file for complete search history.

(56) References Cited

U.S. PATENT DOCUMENTS

| | | | |
|---|---|---|---|
| 5,234,636 A * | 8/1993 | Hull | B33Y 10/00 427/508 |
| 6,003,832 A | 12/1999 | Ueno et al. | |

(Continued)

FOREIGN PATENT DOCUMENTS

| | | | |
|---|---|---|---|
| CN | 113693340 B * | 9/2022 | |
| JP | H09174563 A | 7/1997 | |

(Continued)

OTHER PUBLICATIONS

An Office Action mailed by China National Intellectual Property Administration dated Sep. 5, 2022, which Corresponds to Chinese Patent Application No. 201980036635.8 and is related to U.S. Appl. No. 17/278,956; with English language translation.

(Continued)

*Primary Examiner* — Atul P. Khare
(74) *Attorney, Agent, or Firm* — Studebaker & Brackett PC (57) ABSTRACT

To suppress peeling off of a polymer coating in a polymer member formed to have the polymer coating provided on a surface of a polymer shaped object, performed are: a curing step of causing a curable composition to be cured by energy rays to prepare the polymer shaped object; a coating step of forming the polymer coating on the polymer shaped object; and a post-curing step of irradiating the polymer shaped object with the energy rays after the coating step, wherein, in the curing step, the polymer shaped object in which a reactive functional group is left is prepared.

21 Claims, 5 Drawing Sheets

(51) Int. Cl.
*B29C 64/30* (2017.01)
*B33Y 40/20* (2020.01)
*B29C 71/04* (2006.01)
*C08F 283/00* (2006.01)
*C09D 175/08* (2006.01)
*B05D 7/02* (2006.01)
*C09D 175/00* (2006.01)
*B33Y 80/00* (2015.01)
*B29L 31/50* (2006.01)

(52) U.S. Cl.
CPC ............ *B33Y 10/00* (2014.12); *B33Y 40/20* (2020.01); *C08F 283/008* (2013.01); *C09D 175/08* (2013.01); *B29L 2031/50* (2013.01); *B33Y 80/00* (2014.12)

(56) References Cited

U.S. PATENT DOCUMENTS

| | | | |
|---|---|---|---|
| 11,577,452 B2* | 2/2023 | Miyakawa | ............ B33Y 70/00 |
| 2015/0165679 A1 | 6/2015 | Goto | |
| 2018/0009134 A1 | 1/2018 | Berben et al. | |
| 2019/0275733 A1* | 9/2019 | Hikmet | ................ B29C 70/64 |
| 2019/0276700 A1 | 9/2019 | Hu et al. | |

FOREIGN PATENT DOCUMENTS

| | | | | |
|---|---|---|---|---|
| JP | 2015112845 A | 6/2015 | | |
| JP | 2019155912 A | 9/2019 | | |
| WO | WO-2018095753 A1 * | 5/2018 | ........... | B29C 64/118 |
| WO | WO-2019102304 A1 * | 5/2019 | ......... | A61C 13/0003 |
| WO | WO-2021132699 A1 * | 7/2021 | | |

OTHER PUBLICATIONS

Communication pursuant to Article 94(3) EPC issued by the European Patent Office dated Dec. 1, 2022, which corresponds to European Patent Application No. 19946245.8-1103 and is related to U.S. Appl. No. 17/278,956.

Notification of Transmittal of Translation of the International Preliminary Report on Patentability; PCT/JP2019/049588; dated Jun. 23, 2022.

The extended European search report issued by the European Patent Office dated Sep. 9, 2021, which corresponds to European Patent Application No. 19946245.8-1017 and is related to U.S. Appl. No. 17/278,956.

* cited by examiner

METHOD FOR PRODUCING POLYMER MEMBER

FIELD

The present invention relates to a method for producing a polymer member, and more particularly, to a method for producing a polymer member in which a polymer coating is provided on a surface of a polymer shaped object.

BACKGROUND

Recently, 3D printing technologies by, for example, optical fabrication machines are attracting interests. Unlike conventional injection moldings or the like where molding dies having cavities corresponding to the shapes of polymer shaped objects are required, 3D printers do not necessarily need the molding dies for producing the polymer shaped objects. Therefore, the 3D printing produces great advantages in producing a wide variety of products in small quantities.

Incidentally, in producing polymer members, polymer compositions suitable for the forming methods used for the production sometimes cause difficulties in providing the surface characteristics demanded for final products. For example, the injection moldings are generally advantageous in terms of production efficiencies when polymer compositions having low melt viscosities are used; however, this causes difficulties in imparting the products with the surface characteristics hardly causing thermal deformation. In addition, in 3D printing in which a cured product is deposited in layer-by-layer fashion using a polymer composition having photocurability, uneven surfaces having stepped shapes tend to be formed on the surface of the produced polymer member, and the polymer member having a sufficiently smooth surface is hardly obtained (see Patent Literature 1 below).

CITATION LIST

Patent Literature

Patent Literature 1: JP 2019-155912 A

SUMMARY

Technical Problem

When it is difficult to obtain desired surface characteristics as described above, it is conceivable that, once a polymer shaped product serving as a base of a polymer member is produced with a polymer composition, a polymer coating is formed on the surface of the polymer shaped product to complete the polymer member. However, in such cases, the polymer coating may be stripped off from the polymer shaped object. That is, in a method of producing a polymer member by forming a polymer coating on a surface of a polymer shaped object after producing the polymer shaped object, there is a problem that it is difficult to suppress stripping off of the polymer coating.

Solution to Problem

As a result of extensive studies conducted by the present inventors to solve the above problem, it has been found that the stripping off of the polymer coating can be suppressed by: preparing a polymer shaped object by a curable composition including an organic compound having a functional group which reacts with energy rays; moreover, forming a polymer coating after the polymer shaped object is prepared in a state in which the functional group is left; and then irradiating the polymer shaped object with energy rays. Thus, the present invention has been completed.

In order to solve the aforementioned problem, the present invention provides a method for producing a polymer member formed to have a polymer coating provided on a surface of a polymer shaped object, the method including: a curing step of causing a curable composition including an organic compound having a functional group which reacts with energy rays to be cured by the energy rays to prepare the polymer shaped object; and a coating step of forming the polymer coating on the polymer shaped object obtained in the curing step; wherein, in the curing step, the polymer shaped object including the functional group that has not reacted is prepared, the method further including a post-curing step of irradiating the polymer shaped object with the energy rays after the coating step.

DESCRIPTION OF EMBODIMENTS

Hereinafter, an embodiment of the present invention will be described with reference to the drawings. A description will be given below by taking, for example, the case where a member for a shoe is prepared as a polymer member; however, the present invention is not limited to the following embodiment at all.

Figure 1:
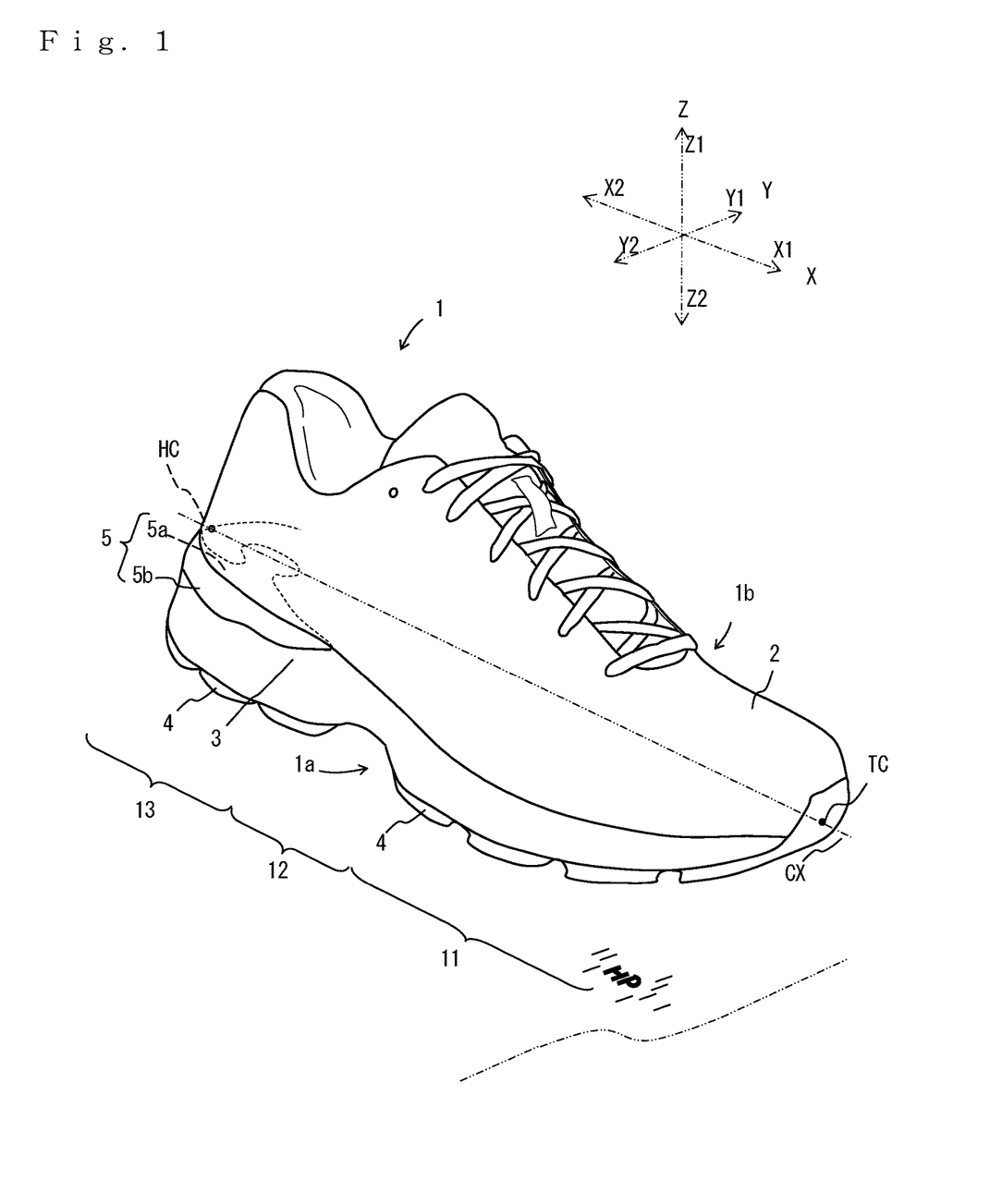
FIG. 1 is a schematic perspective view showing a shoe including a polymer member prepared by a production method according to one embodiment.

FIG. 1 shows a shoe using a polymer member of this embodiment. In the description for a shoe 1 shown in FIG. 1 a direction along a shoe center axis CX connecting a heel center HC and a toe center TC may be referred to as a length direction X. Among directions along the shoe center axis CX, a direction X1 directed from the heel to the toe may be referred to as, for example, a forward direction, and a direction X2 directed from the toe to the heel may be referred to as, for example, a rearward direction. Among directions orthogonal to the shoe center axis CX, a direction parallel to a horizontal plane HP may be referred to as, for example, a width direction Y. Regarding the width direction Y, a direction Y1 directed to the first toe side may be referred to as, for example, a medial side direction, and a direction Y2 directed to the fifth toe side may be referred to as, for example, a lateral side direction. A vertical direction Z orthogonal to the horizontal plane HP may be referred to as a thickness direction or height direction. Further, hereinafter, regarding the vertical direction Z, a direction Z1 directed upward may be referred to as an upward direction, and a direction Z2 directed downward may be referred to as a downward direction.

As shown in FIG. 1, the shoe 1 of this embodiment includes an upper 2 and a sole. The sole is made up of a plurality of shoe parts. The shoe 1 includes a midsole 3 and an outsole 4. The shoe 1 of this embodiment includes an outsole 4 in the bottommost position. The outsole 4 of this embodiment has, for example, a sheet shape, and is disposed at the lowermost portion of the shoe 1 with its thickness direction conforming to the vertical direction Z. The midsole 3 of the shoe 1 is located between the outsole 4 and the upper 2 covering a foot of a wearer from the upper side.

The shoe 1 further includes a shoe member 5, which is a polymer member produced by a production method to be described later. The shoe member 5 of this embodiment is arranged on a lateral side of the shoe 1 and in a hindfoot portion 13 of the shoe 1. The shoe member 5 of this embodiment not only contributes to an improved appearance of the shoe 1 but also has a function to assist a wearer of the shoe 1 in walking since it has different mechanical characteristics from those of the midsole 3 or the like.

Figure 2:
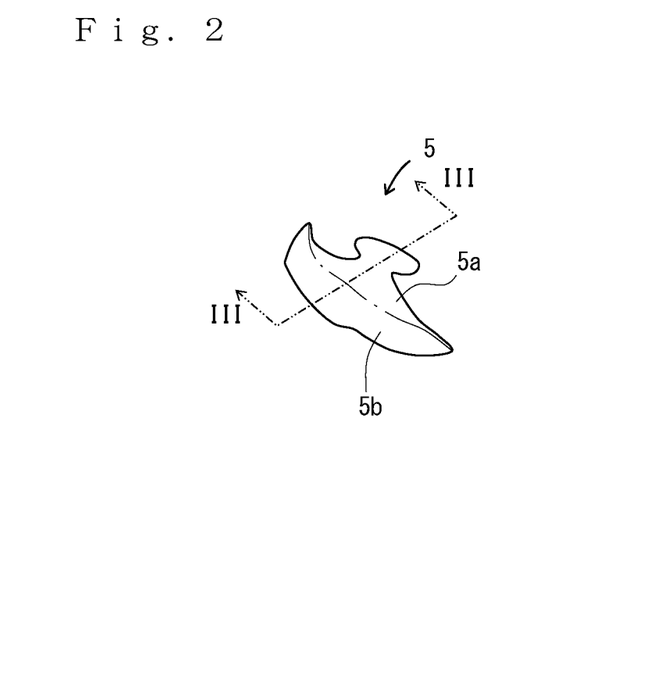
FIG. 2 is a schematic perspective view showing the polymeric member used in the shoe of FIG. 1.

As shown in FIG. 1, the shoe member 5 of this embodiment is arranged with its position in the vertical direction corresponding to the position of the shoe 1 in which the midsole 3 is arranged. As shown in FIG. 1 and FIG. 2, the shoe member 5 of this embodiment includes a wall part 5b extending in the vertical direction of the shoe 1, and a ceiling part 5a extending in the horizontal direction from an upper end of the wall part 5b.

The wall part 5b of the shoe member 5 is arranged to constitute a part of an outer peripheral surface of the shoe 1, and is arranged to cover a part of an outer peripheral surface of the midsole 3 from the lateral side. The wall part 5b is arranged to be exposed on the outer surface of the shoe 1 in this way while the ceiling part 5a extends into the inside of the shoe 1 to be sandwiched between the upper 2 and the midsole 3. That is, the ceiling part 5a of the shoe member 5 is arranged not to constitute the external appearance of the shoe 1.

Figure 3:
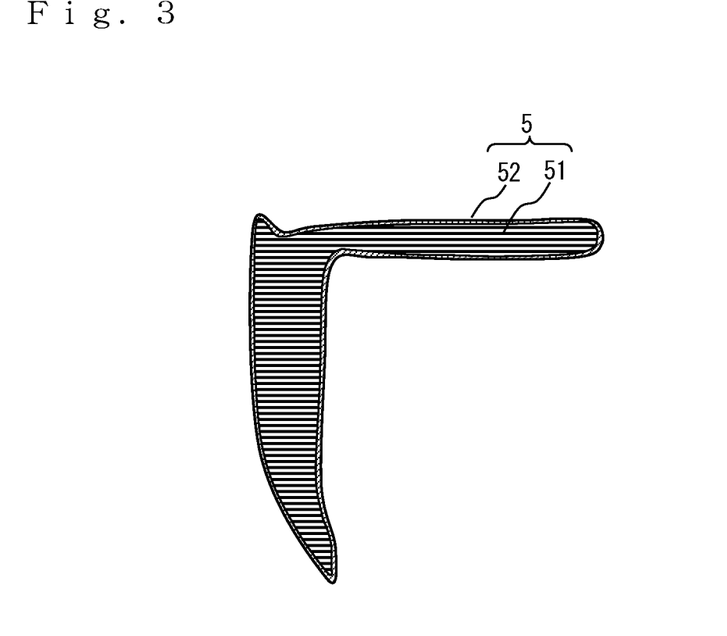
FIG. 3 is a cross-sectional view of the polymer member of FIG. 2 (a cross-sectional view taken along the line and viewed in the direction of arrows III-III thereof in FIG. 2).

As shown in FIG. 3, the shoe member 5 of this embodiment includes a base body 51 slightly smaller than the shoe member 5, and a surface layer 52 covering the outer surface of the base body 51. The shoe member 5 in this embodiment has the base body 51 composed of a polymer shaped object and the surface layer 52 composed of a polymer coating.

The polymer shaped object constituting the base body 51 is composed of a curable composition that is cured by energy rays. That is, the base body 51 in this embodiment is prepared by causing a curable composition including an organic compound having a functional group which reacts with energy rays to be cured by energy rays. More specifically, the base body 51 is composed of a cured product of a curable composition including an organic compound that includes a molecule having a functional group that causes bonding reaction with the same functional group by energy rays, or a functional group that causes bonding reaction with a different functional group by energy rays.

Examples of the energy rays used for preparing the base body 51 include electromagnetic waves, electron rays, and particle radiation, among which electromagnetic waves are preferable since they are easily handled. Among the electromagnetic waves, such light as ultraviolet rays having a wavelength of 10 nm or more and less than 380 nm or visible light having a wavelength of 380 nm or more and less than 760 nm is preferable rather than microwaves or electromagnetic radiation such as X rays or γ rays.

Examples of the functional group included in the organic compound that is included in the curable composition used for preparing the base body 51 include a (meth)acrylic group, an epoxy group, an oxetane group, and an isocyanate group. The organic compound having the functional group may be a monomer or an oligomer in a liquid state at normal temperature, or may be a polymer in a solid state at normal temperature. The organic compound may have a plurality of functional groups in a single molecule. The curable composition may further include an organic compound having an amino group or a hydroxyl group that can react with the aforementioned functional group.

The organic compound is preferably an oligomer having a mass average molecular weight (Mw) of 1000 or more and 15000 or less. In the organic compound, the average number of functional groups in a single molecule is preferably 2 or more and 15 or less.

Examples of the organic compound included in the curable composition used for preparing the base body 51 include an urethane-based (meth)acrylate oligomer, a polyester-based (meth)acrylate oligomer, a polyether-based (meth)acrylate oligomer, a (meth)acrylic (meth)acrylate oligomer, an epoxy-based (meth)acrylate oligomer, a conjugated diene polymer-based (meth)acrylate oligomer, and a hydrogenated product thereof. The organic compound may be a silicone (meth)acrylate oligomer or its hydrogenated product. As the organic compound, the urethane-based (meth)acrylate oligomer is preferable since it can exhibit excellent bonding capability to the polymer coating.

In addition to the aforementioned oligomers, the curable composition may include various polymers, various fillers, and the like. The curable composition may further include various components such as a polymerization initiator, an oil, a pigment, or a weathering agent.

In producing shoes, products having a plurality of different sizes are generally produced. Further, in producing shoes, there are many cases where a plurality of kinds of products having the same shape but different colors are produced. Thus, it is preferable to be able to easily produce a plurality of kinds of the shoe members 5 having different sizes and different colors. An attempt to produce the shoe member 5 with, for example, injection molding necessitates a number of molding dies. Thus, the base body 51 in this embodiment may be prepared by injection molding of a curable composition including a polymer having a functional group that can be cured by energy rays, but is preferably prepared by a method not using a molding die.

The base body 51 in this embodiment is preferably prepared by a method so called 3D printing, and is preferably prepared by an optical fabrication machine. That is, the base body 51 may be composed of a photocurable composition that can be cured by light. The organic compound included in the photocurable composition is preferably an ultraviolet curable (meth)acrylate compound.

In the case where the base body 51 is composed of a photocurable composition, it is preferable that a photopolymerization initiator as the polymerization initiator be included in the photocurable composition. Examples of the photopolymerization initiator include: an acylphosphine oxide-based photopolymerization initiator such as bis(2,4,6-trimethylbenzoil) phenylphosphine oxide or 2,4,6-trimethylbenzoil diphenylphosphine oxide; an alkylphenone-based photopolymerization initiator such as 2,2-dimethoxy-2-phenylacetophenone, 1-hydroxycyclohexyl phenyl ketone, 2-hydroxy-2-methyl-1-phenylpropanone, 2-hydroxy-1-(4-(4-(2-hydroxy-2-methylpropionyl) benzyl) phenyl)-2-methylpropane-1-one, 2-methyl-1-[4-(methylthio)

phenyl]-2-morpholinopropane-1-one, 2-benzyl-2-(dimethylamino)-4'-morpholinobutyrophenone, or 2-dimethylamino-2-(4-methyl-benzyl)-1-(4-morpholine-4-yl-phenyl)-butane-1-one; an intramolecular hydrogen-abstracting photopolymerization initiator such as 3-methylbenzoyl methyl formate; and a cationic photopolymerization initiator.

The photocurable composition of this embodiment preferably includes bis(2,4,6-trimethylbenzoil) phenylphosphine oxide or 2,4,6-trimethylbenzoil diphenylphosphine oxide in order to exhibit favorable reactivity in a curing step or post-curing step to be described later.

The surface layer 52 may be formed by, for example, an electrostatic coating method using powder that includes a polymer serving as the main component of the polymer coating, but is preferably formed using a coating agent that is a liquid agent including a polymer serving as the main component of the polymer coating, in order to be favorably brought into tight contact with the base body 51.

Examples of the polymer included in the coating agent include an ultraviolet-curable resin, a thermosetting resin, and a moisture curing resin, each including a urethane group. The polymer may be an ester-based polymer, an epoxy-based polymer, a silicone-based polymer, or an acrylic polymer. Among these, the polymer is preferably a polyurethane-based polymer.

It is preferable that the coating agent at normal temperature (23° C.) be in a liquid state having a sufficiently low viscosity and have a viscosity of 3000 mPa·s or less. The viscosity can be, for example, measured by a Brookfield rotational viscometer at a rotational speed of 20 rpm. The coating agent having an excessively low viscosity may cause difficulty in forming the surface layer 52 having a sufficient thickness. Thus, the viscosity of the coating agent is preferably 10 mPa·s or more.

In order to allow the coating agent to have the aforementioned viscosity, it is preferable that a dispersion medium or a solvent of the polymer be included in the coating agent. The dispersion medium or the solvent is preferably water or an aqueous organic solvent to provide a favorable working environment in forming the surface layer 52. Examples of the aqueous organic solvent include various alcohols such as methyl alcohol, ethyl alcohol, isopropyl alcohol, or t-butyl alcohol; acetone; and methyl ethyl ketone.

Figure 4:
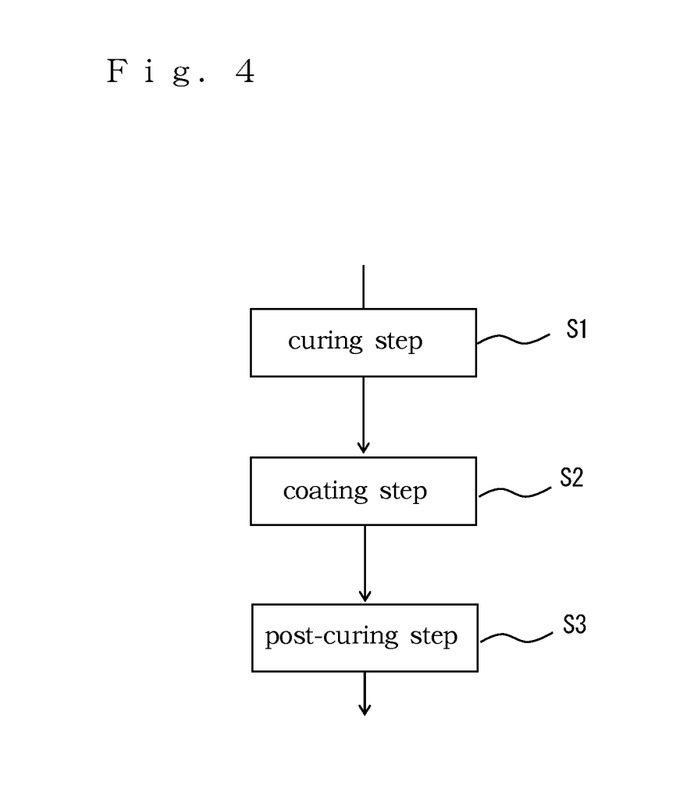
FIG. 4 is a schematic flow diagram showing the method for producing the polymer member.

The shoe member 5 including the surface layer 52 can be produced by, for example, a production method including steps shown in FIG. 4. The polymer member used as the shoe member 5 is subjected to: a curing step S1 of causing the curable composition including the organic compound having the functional group which reacts with energy rays to be cured by energy rays to prepare the polymer shaped object; and a coating step S2 of forming the polymer coating on the polymer shaped object obtained in the curing step S1. In the curing step S1, the polymer shaped object in which the functional group is left is prepared. The polymer member is further subjected to a post-curing step S3 of irradiating the polymer shaped object with energy rays after the coating step S2.

Figure 5:
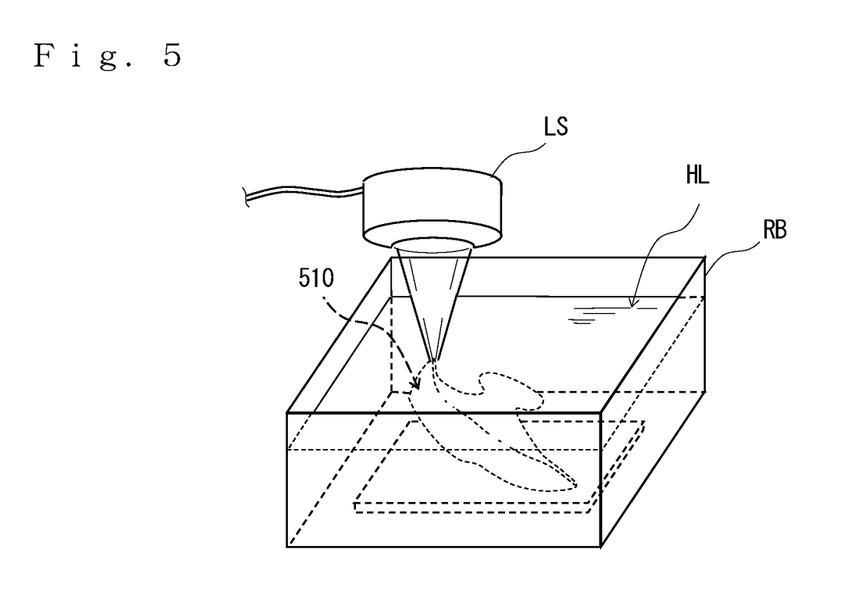
FIG. 5 is a schematic view showing an example of a curing step in the method for producing the polymer member.

In the curing step S1, the polymer shaped object serving as the base body 51 is preferably prepared by 3D printing using an optical fabrication machine, as aforementioned. FIG. 5 shows a state of the curing step S1 using an optical fabrication machine. In the curing step S1, a liquid photocurable composition having a viscosity of 2000 mPa·s or less at normal temperature is preferably used, and a photocurable composition having a viscosity of 1000 mPa·s or less is more preferably used. The viscosity of the photocurable composition is generally 1 mPa·s or more.

In the curing step S1, as shown in FIG. 5, a polymer shaped object 510 can be formed by: placing a photocurable composition HL in a transparent container RB having such an internal volume as to be capable of accommodating the shoe member 5; irradiating the photocurable composition HL with light emitted from the outside of the transparent container RB by a light source LS configured to be able to change a focus position; and causing the photocurable composition HL to be cured by the light.

The polymer shaped object 510 is preferably prepared to have the photocurable composition in a partially-cured state in which it is not completely cured. Whether the prepared polymer shaped object 510 is in the partially-cured state can be confirmed, for example, by irradiating the polymer shaped object 510 with light capable of curing the photocurable composition HL (for example ultraviolet rays) to find an increase or a decrease in functional group abundance before and after the irradiation of the light. More specifically, whether the polymer shaped object is in the partially-cured state without being in complete curing reaction can be confirmed by subjecting the surface of the polymer shaped object 510 to measurement using FT-IR by the ATR method and finding that the infrared absorption peak belonging to the functional group decreases after the irradiation of the light.

In the curing step S1, the polymer shaped object 510 excellent in transparency can be formed. The haze of the polymer shaped object 510 with a thickness of 2 mm obtained based on JIS K7136 is preferably 20% or less, more preferably 15% or less, further preferably 10% or less. The polymer shaped object 510 having such a transparency is advantageous in providing the shoe member 5 with excellent appearance. The polymer shaped object 510 having such a transparency is also advantageous in workability (photocurability) for transforming the photocurable composition from the partially-cured state to the final cured state.

In the curing step S1, the polymer shaped object obtained for removing surface deposit may be washed. Washing the polymer shaped object with water or an aqueous organic solvent can also produces an effect of increasing the number of the functional groups (e.g., (meth)acrylate group) on the surface of the polymer shaped object. In the case where washing is performed in the curing step S1, a step of allowing the polymer shaped object to dry may be performed before the coating step S2.

Figure 6:
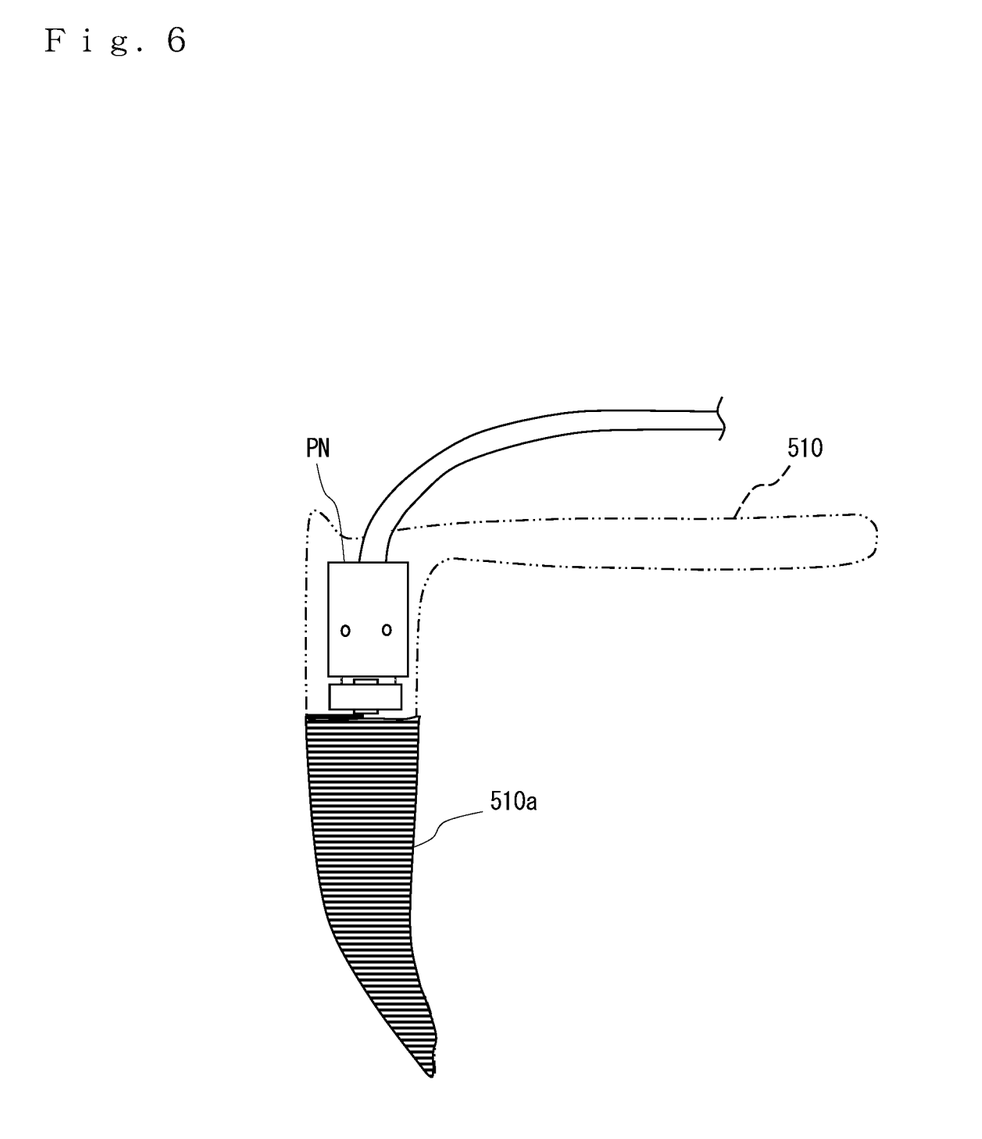
FIG. 6 is a schematic view showing another example of a curing step in a method for producing a polymer member.

The curing step S1 can be performed not only by an optical fabrication method but by, for example, 3D printing using the material extrusion and deposition method as shown in FIG. 6. In the case where the polymer shaped object 510 is prepared by the material extrusion and deposition method in the curing step S1, the polymer shaped object 510 can be prepared by a method of sequentially depositing each of a plurality of layers onto another layer in the height direction of the preparing polymer shaped object 510, as shown in FIG. 6. In the method, it is preferable that the polymer shaped object 510 be prepared by a method in which plate shaped bodies each having a size corresponding to the shape of each of cut surfaces obtained by cutting the preparing polymer shaped object 510 along the horizontal plane at a specific pitch from a lower end thereof, and each having a thickness corresponding to the specific pitch are formed of the curable composition to sequentially deposit the plate shaped bodies from the lower end.

The material extrusion and deposition method can be suitable when the curable composition used is solid at normal temperature or when a curable composition having low transparency is used. The material extrusion and deposition method also enables a polymer shaped object having a hollow structure to be easily prepared.

In the material extrusion and deposition method, for example, the curable composition in a heated and molten state is discharged from a 3D printer nozzle PN to sequentially form plate shaped bodies, and one plate shaped body is deposited on another plate shaped body that has in pre-cooled and pre-solidified state to prepare a deposited product 510a, which is the final polymer shaped object 510. Thus, the polymer shaped object 510 prepared by the method has an outer surface with steps having a stair shape. The steps function to firmly retain the coating agent on the surface of the polymer shaped object 510 in the coating step S2. Further, the steps effectively function to achieve excellent bonding capability between the polymer coating and the polymer shaped object.

In the optical fabrication method, slight steps can also be formed on the surface of the polymer shaped object.

When a direction in which the polymer shaped object is formed corresponds to the height direction, the steps each have a height of preferably 0.01 mm or more, more preferably 0.05 mm or more, further preferably 0.1 mm or more. The steps each have a height of preferably 1 mm or less, more preferably 0.8 mm or less, further preferably 0.5 mm or less.

The configurations that the plate shaped objects are made in a partially-cured state and that the partially-cured state can be confirmed with FT-IR are the same as the configurations required when the optical fabrication machine is used.

The curing step S1 can be performed also by any 3D printing other than the aforementioned 3D printing, or can be performed also by any method other than 3D printing.

In the curing step S1, if only the curing of the curable composition during the preparation of the polymer shaped object is thought to be incapable of achieving a sufficient degree of curing, the curing may be allowed to progress before the coating step. That is, in the curing step S1, the polymer shaped product that has been prepared may be subjected to an additional curing reaction to bring it in a cured state suitable for being subjected to the coating step S2 and the post-curing step S3. The additional curing reaction at this time may be caused not only by the irradiation of energy rays but also by, for example, thermosetting reaction.

The coating step S2 for forming the polymer coating on the surface of the polymer shaped object formed in the curing step S1 can be performed by, for example, applying the coating agent to the polymer shaped object using a brush. In the coating step S2, the coating agent may be sprayed to coat the polymer shaped object. In the coating step S2, a method may be employed in which the polymer shaped object is immersed in the coating agent filled in a tank. In addition to the aforementioned methods, the coating step S2 can be performed by any known method.

In the coating step S2, the polymer shaped object covered with the coating agent may be heated or exposed to wind to accelerate forming of the polymer coating.

Performed after the coating step S2 is the post-curing step of irradiating the polymer shaped object in a partially-cured state with energy rays such as ultraviolet rays. The energy rays are irradiated through the coating agent covering the polymer shaped object. Thus, the coating agent preferably has low energy absorptivity of the energy rays. The coating agent and the polymer coating formed of the coating agent are preferably excellent in transparency as in the polymer shaped object, and each have a haze of preferably 20% or less when they have a thickness of 2 mm, as in the polymer shaped object. The hazes of the coating agent and the polymer coating are each preferably 15% or less, further preferably 10% or less. The hazes of the coating agent and the polymer coating are each preferably equal to or lower than the haze of the polymer shaped object, more preferably 80% or less of the haze of the polymer shaped object.

The coating agent used in the coating step S2 is preferably of a water emulsion type in which water serves as a dispersion medium, in consideration of, for example, a working environment.

The post-curing step S3 can be performed using various sources of energy rays. The energy rays used in the post-curing step S3 may be the same as or different from the energy rays used for the curing reaction in the curing step S1. Examples of the sources of energy rays include a metal halide lamp, a high-pressure mercury lamp, and an LED lamp. In the post-curing S3, solar light may be used as the energy rays.

The post-curing step S3 is preferably performed so that the peak height peculiar to the functional group obtained when the outer surface of the polymer shaped object (base body 51) is subjected to measurement with FT-IR is equal to or less than the half of the peak height before the post-curing step.

The post-curing step S3 may be performed so that the surface energy of the polymer shaped object (base body 51) after the post-curing step is lower than the surface energy of the polymer coating (surface layer 52). In this embodiment, the polymer shaped object is irradiated with energy rays after the coating step is performed using the polymer shaped object in which the functional group is left; thus, the molecular chains of the polymer included in the curable composition constituting the base body 51 and the molecular chains of the polymer included in the polymer coating are entangled with each other or chemically bonded to each other. The relationship of the surface energies as above inherently causes the polymer coating to be easily stripped off, but in this embodiment exhibits high bonding capability between the base body 51 and the surface layer 52.

The coating agent including an organic solvent is more advantageously used in the coating step than the water emulsion type to exhibit high bonding force to the polymer shaped object. Since the polymer member (shoe member 5) of this embodiment exhibits high bonding force between the base body 51 and the surface layer 52 when the molecular chains are entangled with each other as aforementioned, use of the water emulsion type coating agent can still suppress the surface layer 52 from being stripped off from the base body 51.

The polymer member (shoe member 5) of this embodiment may have a type A durometer hardness (instantaneous value) specified in JIS K6253-3 of 95 or less, or 90 or less. The polymer member (shoe member 5) having low hardness is easily deformed to cause the surface layer 52 from being easily stripped off from the base body 51, but in this embodiment the likelihood of such stripping off can be suppressed. That is, the polymer member (shoe member 5) of this embodiment having the durometer hardness as aforementioned more remarkably exhibits the effect of the present invention.

The surface layer 52 has a pencil hardness of preferably 4H or more, more preferably 5H or more.

This embodiment has been described by taking, for example, the case where the polymer member arranged in the midsole 3 of the shoe 1 is used as the shoe member 5, but the polymer member may constitute a part or the whole of the outsole 4. The polymer member can be used not only as a shoe member such as the outsole 4, but also for a wide range of other applications. The polymer member can be used for various applications including toys such as dolls, sporting goods, cushion materials, antislipping materials, tires, and sealing materials. In this case, materials and methods for forming polymer shaped objects and polymer coatings can be modified to those suitable for the applications. That is, the present invention is not limited to the aforementioned embodiment at all.

EXAMPLES

Next, the present invention will be described in more detail by way of Examples, without limitation thereto.

Comparative Example 1

A photocurable composition including: a urethane-based (meth)acrylate oligomer having a (meth)acrylic group at an end of a polyether type polyurethane; an acrylic monomer; and a photopolymerization initiator was prepared. A plate shaped polymer shaped object composed of the photocurable composition in a partially-cured state and having a thickness of 2 mm and a size of 50 mm×50 mm square was prepared using a commercially available 3D printer (product name: "Shuffle XL" manufactured by Phorozen). The polymer shaped object being immersed in isopropyl alcohol was subjected to ultrasonic washing for 2 minutes, and the polymer shaped object after the ultrasonic washing was placed in a thermostatic tank at 60° C. for 10 minutes for drying. The dried polymer shaped object was irradiated with ultraviolet rays (UV-A) for post-curing to have an integrated energy of 8 J/cm$^2$.

An emulsion type coating agent that includes a polyether type polyurethane and water as a dispersion medium was prepared, and applied to the surface of the post-cured polymer shaped object using a brush, followed by being dried in a thermostatic tank at 60° C. for 10 minutes to form a polymer coating on the surface of the polymer shaped object. A urethane-based bond was applied to the surface of the polymer member on which the polymer coating has been formed, and then dried in a thermostatic tank at 60° C. for 5 minutes. The same urethane-based bond was applied to a sheet composed of thermoplastic polyurethane, and then likewise dried in a thermostatic tank at 60° C. for 5 minutes. The polymer member and the sheet were superposed on each other so that their respective surfaces to which the urethane-based bond was applied were in contact with each other, and were brought into pressure contact with each other using a pressure contact machine to prepare a laminated body, which was then left to stand in an environment at 23° C. for about 3 days. A strip shaped sample having a width of 2 cm was cut out of the laminated body that had been left to stand for about 3 days after the pressure contact, and the sheet was stripped off from the polymer member at a rate of 50 mm/min to measure stress required for the stripping. The stress at that time was 0.1 kgf or less, and the polymer coating was easily stripped off from the polymer shaped object. The surface energy of the polymer shaped object and the surface energy of the polymer coating were obtained by the contact angle method, the results of which are shown in Table 1 below.

The surface energy was obtained by measuring a contact angle between the surface of the polymer shaped product or the surface of the polymer coating and each of standard liquids (diiodomethane, ethanol, and pure water) using a contact angle meter (product name: "DMs-401") manufactured by Kyowa Interface Science Co., Ltd., and then making calculations based on the measured results of the contact angles using the analysis software accompanied by the meter (product name: "FAMAS", calculation method: "Kitazaki and Hata's theoretical formula"). Specifically, the surface energy of the polymer shaped object was measured using, as a sample, a sheet shaped cured product that had been cured under various conditions (thickness of 2 mm), and the surface energy of the polymer coating was measured using, as a sample, a polymer coating formed on the surface of the sheet shaped cured product. The measurements were conducted after the samples prepared had been kept under an environment adjusted to standard conditions (23° C., 50% RH), and were conducted under the same environment. In each of the measurements, each of the samples was placed on the table of the contact angle meter (product name: "DMs-401"), and diiodomethane, ethanol, and pure water were dropped from respective syringes onto the sample to measure their contact angles, based on which the surface energy was calculated using the analysis software accompanied by the meter (product name: "FAMAS").

Comparative Example 2

A polymer member was formed in the same manner as Comparative Example 1, except that it was not subjected to ultraviolet post-curing, and the polymer member was evaluated in the same manner as Comparative Example 1. As a result, the stress at the time of peeling off was 0.1 kgf or less, and the polymer coating was easily peeled off from the surface of the polymer shaped object similar to Comparative Example 1.

Example 1

Curing Step

A photocurable composition including: a urethane-based (meth)acrylate oligomer having a (meth)acrylic group at an end of a polyether type polyurethane; an acrylic monomer; and a photopolymerization initiator was prepared. A polymer shaped object composed of the photocurable composition in a partially-cured state and having a thickness of 2 mm and a size of 50 mm×50 mm square was prepared using a commercially available 3D printer (product name: "Shuffle XL" manufactured by Phorozen). The polymer shaped object immersed in isopropyl alcohol was subjected to ultrasonic washing for 2 minutes, and the polymer shaped object after the ultrasonic washing was placed in a thermostatic tank at 60° C. for 10 minutes for drying.

Coating Step

An emulsion type coating agent that includes a polyether type polyurethane and water as a dispersion medium was prepared, and applied to the surface of the polymer shaped object using a brush, followed by being dried in a thermostatic tank at 60° C. for 10 minutes to form a polymer coating on the surface of the polymer shaped object.

Post-Curing Step

The dried polymer shaped object was irradiated with ultraviolet rays (UV-A) for post-curing to have an integrated energy of 2 J/cm$^2$.

A urethane-based bond was applied to the surface of the post-cured polymer member, and then dried in a thermostatic tank at 60° C. for 5 minutes. The same urethane-based bond was applied to a thermoplastic polyurethane sheet, and then likewise dried in a thermostatic tank at 60° C. for 5 minutes. The polymer member and the sheet were superposed on each other so that their respective surfaces to which the urethane-based bond was applied were in contact with each other, and were brought into pressure contact with each other using a pressure contact machine to prepare a laminated body, which was then left to stand in an environment at 23° C. for about 3 days. A strip shaped sample having a width of 2 cm was cut out of the laminated body that had been left to stand for about 3 days after the pressure contact, and the sheet was stripped off from the polymer member at a rate of 50 mm/min to measure stress required for the stripping. As a result, it was confirmed that the stress required for the peeling off was 1.1 kgf, and that a favorable bonding force acted between the polymer coating and the polymer shaped object.

TABLE 1

| | Surface energy of polymer member (polymer coating) | Surface energy of polymer shaped object | Stress observed at peeling off |
|---|---|---|---|
| C. Ex. 1 | 62.5 mJ/m$^2$ | 52.5 mJ/m$^2$ | 0.1 kgf/2 cm |
| C. Ex. 2 | 62.5 mJ/m$^2$ | 49.8 mJ/m$^2$ | 0.1 kgf/2 cm |
| Ex. 1 | 62.5 mJ/m$^2$ | 52.5 mJ/m$^2$ | 1.1 kgf/2 cm |

As described above, it is understood that the present invention enables the polymer member from which the polymer coating is hardly peeled off to be obtained.

REFERENCE SIGNS LIST

1: Shoe
2: Upper
3: Midsole
4: Outsole
5: Shoe member (polymer member)
51: Base body
52: Surface layer
510: Polymer shaped object

The invention claimed is:

1. A method for producing a polymer member having a polymer coating provided on a surface of a polymer shaped object, the method comprising:
curing a curable composition comprising a plurality of organic compounds having functional groups by irradiating the curable composition with energy rays, wherein some of the functional groups react upon being irradiated with the energy rays to form the polymer shaped object, and wherein some of the functional groups in the polymer shaped object are not reacted by the curing;
after the curing, forming the polymer coating on the polymer shaped object; and
after forming the polymer coating, performing a post-curing by irradiating the polymer shaped object through the polymer coating with additional energy rays to subject the polymer shaped object to additional curing by reacting at least some of the unreacted functional groups,
wherein the post-curing is performed so that the polymer shaped object, after being subjected to the post-curing, has a lower surface energy than a surface energy of the polymer coating.

2. The method for producing the polymer member according to claim 1, wherein
during the forming of the polymer coating, a liquid coating agent comprising a polymer is applied to the polymer shaped object, and the applied liquid coating agent is dried to form the polymer coating.

3. The method for producing the polymer member according to claim 2, wherein the coating agent further comprises water or an aqueous organic solvent in which the polymer is dispersed.

4. The method for producing the polymer member according to claim 3, wherein
the curable composition is a liquid photocurable composition that can be cured by light, and
during the curing, the photocurable composition is irradiated with light from an optical fabrication machine including a light source configured to change a focus position thereof, such that
the photocurable composition is cured by the light to form the polymer shaped object.

5. The method for producing the polymer member according to claim 4, wherein the plurality of organic compounds include an ultraviolet-curable (meth)acrylate compound, and the curable composition comprises a photopolymerization initiator.

6. The method for producing the polymer member according claim 4, wherein the polymer member is a shoe member.

7. The method for producing the polymer member according to claim 3, wherein the plurality of organic compounds include an ultraviolet-curable (meth)acrylate compound, and the curable composition comprises a photopolymerization initiator.

8. The method for producing the polymer member according claim 3, wherein the polymer member is a shoe member.

9. The method for producing the polymer member according to claim 2, wherein
the curable composition is a liquid photocurable composition that can be cured by light, and
during the curing, the photocurable composition is irradiated with light from an optical fabrication machine including a light source configured to change a focus position thereof, such that
the photocurable composition is cured by the light to form the polymer shaped object.

10. The method for producing the polymer member according to claim 9, wherein the plurality of organic compounds include an ultraviolet-curable (meth)acrylate compound, and the curable composition comprises a photopolymerization initiator.

11. The method for producing the polymer member according claim 9, wherein the polymer member is a shoe member.

12. The method for producing the polymer member according to claim 2, wherein the plurality of organic compounds include an ultraviolet-curable (meth)acrylate compound, and the curable composition comprises a photopolymerization initiator.

13. The method for producing the polymer member according claim 12, wherein the polymer member is a shoe member.

14. The method for producing the polymer member according claim 2, wherein the polymer member is a shoe member.

15. The method for producing the polymer member according to claim 1, wherein
the curable composition is a liquid photocurable composition that can be cured by light, and
during the curing, the photocurable composition is irradiated with light from an optical fabrication machine including a light source configured to change a focus position thereof, such that the photocurable composition is cured by the light to form the polymer shaped object.

16. The method for producing the polymer member according to claim 15, wherein the plurality of organic compounds include an ultraviolet-curable (meth)acrylate compound, and the curable composition comprises a photopolymerization initiator.

17. The method for producing the polymer member according claim 15, wherein the polymer member is a shoe member.

18. The method for producing the polymer member according to claim 1, wherein the plurality of organic compounds include an ultraviolet-curable (meth)acrylate compound, and the curable composition comprises a photopolymerization initiator.

19. The method for producing the polymer member according claim 18, wherein the polymer member is a shoe member.

20. The method for producing the polymer member according to claim 1, wherein the polymer member is a shoe member.

21. The method for producing the polymer member according to claim 1, wherein molecular chains of a polymer constituting the polymer shaped object and molecular chains of a polymer included in the polymer coating are entangled with each other or chemically bonded to each other after performing the post-curing.

\* \* \* \* \*